(12) United States Patent
Liu et al.

(10) Patent No.: US 9,742,900 B2
(45) Date of Patent: Aug. 22, 2017

(54) METHOD, TERMINAL DEVICE AND STORAGE MEDIUM FOR DISPLAYING INFORMATION

(71) Applicant: Xiaomi Inc., Beijing (CN)

(72) Inventors: Yuxiang Liu, Beijing (CN); Zhongliang Qiao, Beijing (CN); Jia Cao, Beijing (CN); Botian Wang, Beijing (CN)

(73) Assignee: XIAOMI INC., Beijing (CN)

( * ) Notice: Subject to any disclaimer, the term of this patent is extended or adjusted under 35 U.S.C. 154(b) by 275 days.

(21) Appl. No.: 14/265,342

(22) Filed: Apr. 29, 2014

(65) Prior Publication Data

US 2015/0030146 A1    Jan. 29, 2015

Related U.S. Application Data

(63) Continuation of application No. PCT/CN2014/072298, filed on Feb. 20, 2014.

(30) Foreign Application Priority Data

Jul. 25, 2013  (CN) .......................... 2013 1 0317524

(51) Int. Cl.
*H04M 1/725* (2006.01)
*H04M 3/42* (2006.01)
(Continued)

(52) U.S. Cl.
CPC ..... *H04M 1/72561* (2013.01); *H04M 3/4217* (2013.01); *H04M 3/4931* (2013.01);
(Continued)

(58) Field of Classification Search
CPC ........... H04M 3/4211; H04M 1/72561; H04M 1/2478; H04M 3/4217; H04M 3/4931;
(Continued)

(56) References Cited

U.S. PATENT DOCUMENTS

| 2006/0005207 A1* | 1/2006 | Louch ....................... G06F 8/38 719/328 |
| 2006/0046768 A1* | 3/2006 | Kirbas ............ H04M 1/274516 455/550.1 |
| 2009/0063474 A1* | 3/2009 | Curry et al. ...................... 707/5 |

FOREIGN PATENT DOCUMENTS

| CN | 101127784 A | 2/2008 |
| CN | 101192222 A | 6/2008 |

(Continued)

OTHER PUBLICATIONS

"International Search Report for PCT/CN2014/072298", Jun. 2014.

*Primary Examiner* — Antim Shah
(74) *Attorney, Agent, or Firm* — Jun He Law Offices P.C.; James J. Zhu

(57) ABSTRACT

The present disclosure discloses a method, a terminal device and a storage medium for displaying information in the terminal device. The method includes: acquiring service option information with an information type identifier of a yellow-pages number, and displaying a service option corresponding to the service option information on a contact page of the yellow-pages number according to the information type identifier. With the present disclosure, by displaying the service option corresponding to the service option information in the contact page of the yellow-pages number, various service options corresponding to various services provided by a person, a business or an organization, represented by the yellow-pages number, may be added into a contact list and prompt a user without costing excessive manpower and material resources on separate developments for each service, and thus the method is expandable, easy to operate and time efficient.

14 Claims, 8 Drawing Sheets

(51) Int. Cl.
*H04M 3/493* (2006.01)
*H04M 3/487* (2006.01)
*H04L 29/08* (2006.01)

(52) U.S. Cl.
CPC ........... *H04L 67/00* (2013.01); *H04M 3/4878* (2013.01); *H04M 2201/38* (2013.01)

(58) Field of Classification Search
CPC .. H04M 2201/38; H04M 3/4878; H04L 67/00
USPC ........................................ 379/201.04, 218.01
See application file for complete search history.

(56) References Cited

FOREIGN PATENT DOCUMENTS

CN  103401982 A  11/2013
WO  2009152641 A1  12/2009

* cited by examiner

METHOD, TERMINAL DEVICE AND STORAGE MEDIUM FOR DISPLAYING INFORMATION

CROSS REFERENCE TO RELATED APPLICATION

The present application is a Continuation of International Application No. PCT/CN2014/072298, filed Feb. 20, 2014, which is based upon and claims priority to Chinese Patent Application No. 201310317524.9, filed on Jul. 25, 2013, the entire contents of which are incorporated herein by reference.

TECHNICAL FIELD

The present disclosure relates to the field of terminal technology, and more particularly to a method, a terminal device and a storage medium for displaying information in the terminal device.

BACKGROUND

Currently, telephone numbers of service providers consist a large part of the telephone numbers received or dialed by a user. Similar to a detailed contact page in a terminal device, detailed contact information of service providers, specifically including information of portraits, names, contact numbers and the likes corresponding to the service providers, may be displayed in a contact list.

Generally, the contact number corresponding to a person, a business or an organization that provides various types of services to users can be referred as a yellow-pages number. For example, the service number of China Mobile is 10086 in China. A user may receive service such as querying a phone bill, funding a prepaid account and the like by dialing 10086. The number for ordering a takeout from KFC is 400-882-3823 in China. A user may query the location of a KFC restaurant nearby and get an ordering service by dialing this phone number. However, if a user wants to obtain information about KFC coupons, it may be required for the user to access the KFC website.

Accordingly, various types of services may be provided by dialing the yellow-pages number, and the service provider corresponding the yellow-pages number may provide different services through other medium (e.g. a website) as well. Currently, users store yellow-pages numbers in their current contact list in the terminal device and get services by dialing the yellow-pages numbers or through other medium.

SUMMARY

The present disclosure provides a method, a terminal device and a storage medium for displaying information in the terminal device, which is capable of adding various service options corresponding to various services provided by a person, a business or an organization, represented by the yellow-pages number to the contact list.

According to a first aspect of the embodiments of the present disclosure, there is provided a method for displaying information in a terminal device, comprising: acquiring service option information with an information type identifier of a yellow-pages number; and displaying a service option corresponding to the service option information on a contact page of the yellow-pages number according to the information type identifier.

According to a second aspect of the embodiments of the present disclosure, there is provided a terminal device, comprising: a processor; and a memory for storing instructions executable by the processor; wherein the processor is configured to execute the instructions to: acquire service option information with an information type identifier of a yellow-pages number; and display a service option corresponding to the service option information on a contact page of the yellow-pages number according to the information type identifier.

According to a third aspect of the embodiments of the present disclosure, there is provided a non-transitory computer-readable storage medium having stored therein instructions that, when executed by a processor of a terminal device, causes the terminal device to perform a method for displaying information, the method comprising: acquiring service option information with an information type identifier of a yellow-pages number; and displaying a service option corresponding to the service option information on a contact page of the yellow-pages number according to the information type identifier.

The method, terminal device and storage medium according to the embodiments of the present disclosure, by a manner of displaying a service option corresponding to information on service option in a page of the yellow-pages number, can add various service options, which corresponds to various services provided by a contact person or organization who owns the yellow-pages number, into a contact list, and prompt a user, without consuming too much manpower and material resources on separate developments of each of the services, and thus the method is expandable, easy for operation and time economic.

It should be understood that the above general description and the detailed description below are merely exemplary, and do not limit the present disclosure.

BRIEF DESCRIPTION OF THE DRAWINGS

The accompanying drawings incorporated below constitute a part of this specification, which illustrate the embodiments of the present disclosure, and together with the specification serve to explain the principles of the present disclosure.

In order to illustrate the technical solutions of the embodiments of the present disclosure more apparently, a brief description of the drawings will be given below. Obviously, the drawings described below only illustrate some embodiments of the present disclosure, and for those skilled in the art, other drawings may be obtained based on these drawings without inventive effort.

DETAILED DESCRIPTION

A clear and thorough description will be given to the technical solution of the present disclosure with reference to the accompanying drawings of the present disclosure. Obviously, the illustrated embodiments are not all of the embodiments of the present disclosure, but only a part of them. According to the embodiments of the present disclosure, all other embodiments obtained by those skilled in the art without any creative effort fall within the protection scope of the present disclosure.

Figure 1:
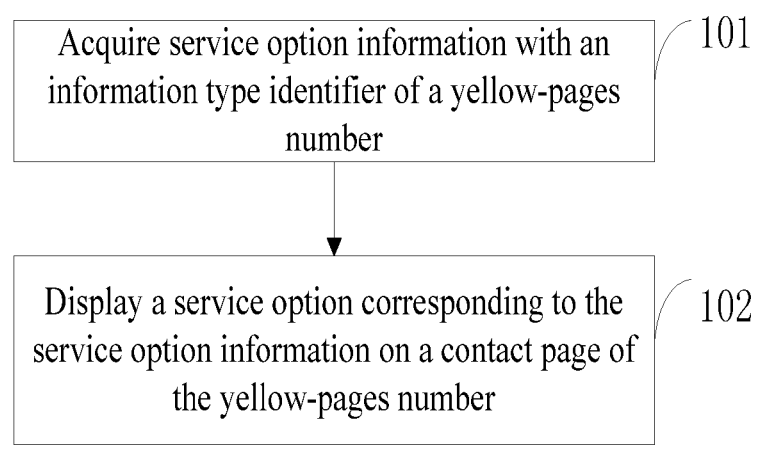
FIG. 1 is a flowchart showing a method for displaying information in a terminal device according to an embodiment of the present disclosure.

FIG. 1 is a flowchart showing a method for displaying information in a terminal device according to the present disclosure. In this embodiment of the present disclosure, the terminal device executes the method. Referring to FIG. 1, the method includes the following steps.

In step 101, service option information with an information type identifier of a yellow-pages number is acquired.

Here, the yellow-pages number is a contact number corresponding to a person, a business or an organization that provides various types of services to users. The information type identifier is used to indicate the type of information displayed by the service option information of the yellow-pages number. For example, a terminal device may obtain service option information of any yellow-pages number transmitted from a server, so as to display a service option corresponding to the yellow-pages number in a contact list according to the type of information.

In step 102, a service option corresponding to the service option information is displayed in a contact page of the yellow-pages number according to the information type identifier.

In the present disclosure, the service option corresponding to the service option information may be displayed in the contact page of the yellow-pages number in the contact list of the terminal device. However, the present disclosure is not limited hereto.

In the method according to the present disclosure, the service option information of the yellow-pages number, which contains the information type identifier, is acquired, and the service option corresponding to the service option information is displayed in the contact page of the yellow-pages number according to the information type identifier. By displaying the service option corresponding to the service option information in the contact page of the yellow-pages number, the technical solution of present disclosure can add various service options corresponding to various services provided by the person, business or organization, represented by the yellow-pages number into the contact list, and may prompt a user without costing excessive manpower and material resources on separate developments for each service, and thus the method is expandable, easy to operate and time efficient.

For example, the acquiring of the service option information of the yellow-pages number includes acquiring the service option information of the yellow-pages number by calling an interface of a server for upgrading the service option information.

For example, the displaying of the service option in the contact page of the yellow-pages number depends on the information type identifier and the service option information. In the present disclosure, four examples of various information type identifiers and various service option information will be explained. However, the present disclosure is not limited hereto.

When the information type identifier is a webpage type identifier and the service option information includes webpage contents, the displaying of the service option in the contact page of the yellow-pages number comprises determining the webpage contents included in the service option information as the service option and displaying the service option corresponding to the service option information in the contact page of the yellow-pages number.

When the information type identifier is a webpage type identifier and the service option information includes a webpage link, the displaying of the service option in the contact page of the yellow-pages number comprises acquiring webpage contents corresponding to the webpage link, determining the acquired webpage contents as the service option, and displaying the service option corresponding to the service option information in the contact page of the yellow-pages number.

When the information type identifier is a jump-link type identifier and the service option information includes a first illustrative text and an application identifier, the displaying of the service option in the contact page of the yellow-pages number comprises determining the first illustrative text as the service option, displaying the service option corresponding to the service option information in the contact page of the yellow-pages number, and creating a mapping relationship between the first illustrative text and an application corresponding to the application identifier.

When the information type identifier is a jump-link type identifier and the service option information includes a second illustrative text and a corresponding webpage link, the displaying of the service option in the contact page of the yellow-pages number comprises determining the second illustrative text as the service option, and displaying the service option corresponding to the service option information in the contact page of the yellow-pages number.

For example, when an operation of triggering the first illustrative text is detected, which is after determining the first illustrative text as the service option, displaying the service option corresponding to the service option information in the contact page of the yellow-pages number, and creating the mapping relationship between the first illustrative text and the application corresponding to the application identifier when the information type identifier is the jump-link type identifier and the service option information includes the first illustrative text and the application identifier, the method further includes: starting the application corresponding to the application identifier according to the mapping relationship.

For example, when the operation of triggering the first illustrative text is detected, a step of starting the application corresponding to the application identifier according to the mapping relationship is performed, which includes: acquiring additional information corresponding to the application identifier, when the operation of triggering the first illustrative text is detected, and starting the application corresponding to the application identifier according to the mapping relationship so as to input the additional information in an interface of the application.

For example, when the information type identifier is the jump-link type identifier and the service option information includes the second illustrative text and the corresponding webpage link, the method further includes a step of jumping to a webpage directed to by the corresponding webpage link when an operation of triggering the second illustrative text is detected. In this case, the step of jumping is performed after the second illustrative text is determined as the service option, and the service option corresponding to the service option information is displayed in the contact page of the yellow-pages number.

All of the above technical solutions may form other alternative embodiments according to the present disclosure in an arbitrary combination thereof, and the description thereof will be omitted herein.

Figure 2:
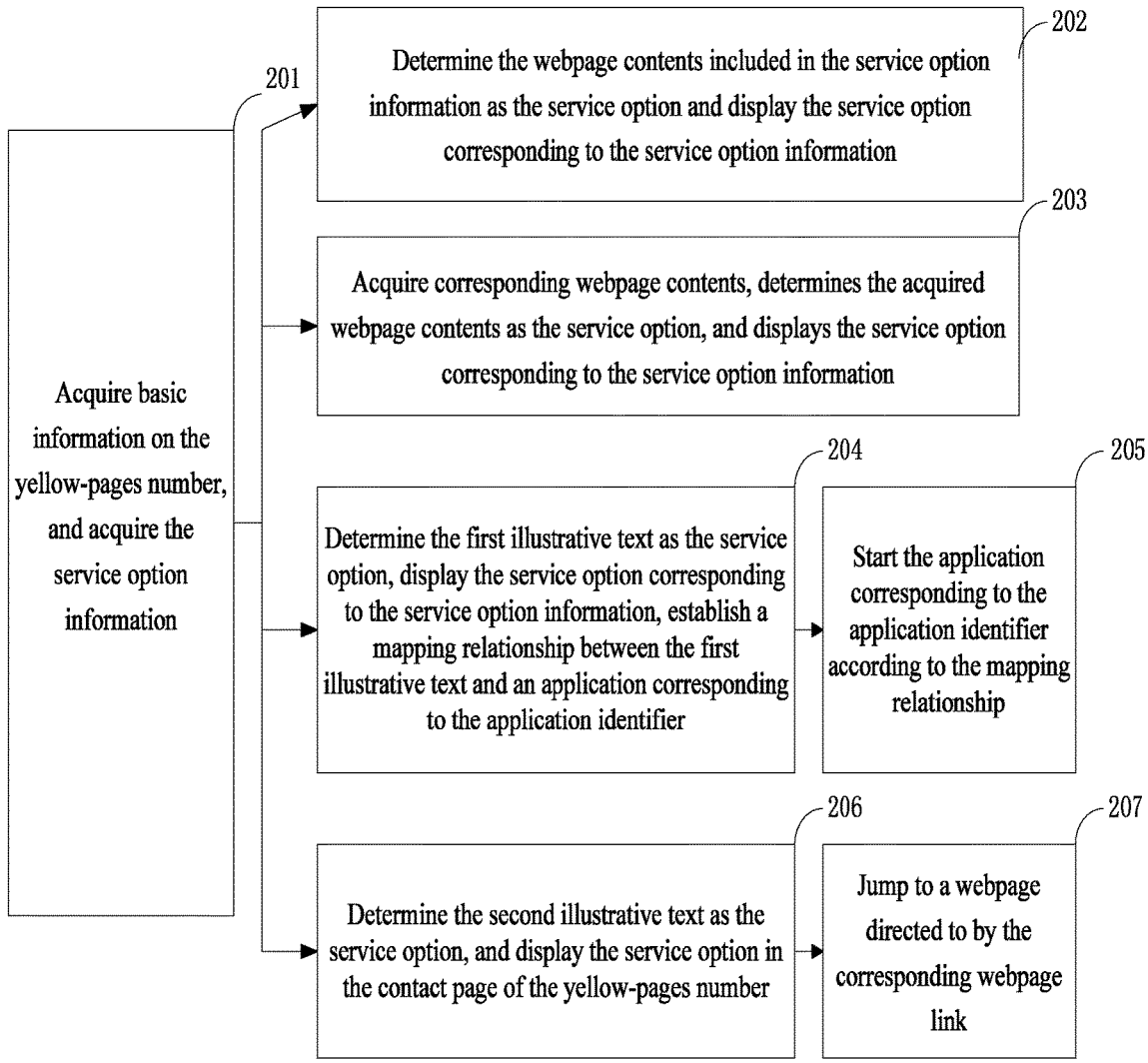
FIG. 2 is a flowchart showing a method for displaying information in a terminal device according to an embodiment of the present disclosure.

FIG. 2 is a flowchart showing a method for displaying information in a terminal device according to an embodiment of the present disclosure. In this embodiment of the present disclosure, a terminal device executes the method as shown in FIG. 2. Referring to FIG. 2, the method includes the following steps.

In step 201, a terminal device acquires service option information with an information type identifier of a yellow-pages number by calling an interface of a server for upgrading the service option information, and then the steps 202, 203, 204 or 206 is performed.

Moreover, the server is configured to collect service option information of various persons, businesses or organizations associated with their respective yellow-pages numbers. The interface of the server may be set up by a skilled person during development, or may be added, modified or deleted by a user during usage. However, the present disclosure is not limited thereto.

In addition, the service option information contains an information type identifier, which is configured to indicate the type of information displayed by the service option information and may include a webpage type identifier or a jump-link type identifier. However, the present disclosure is not limited thereto.

In the present disclosure, the yellow-pages number and one or more service option provided by a person, a business or an organization which associates with the yellow-pages number may be displayed in a contact list of the terminal device, so as to facilitate the user to obtain information on services provided by the person, business or organization as well as some basic information such as a phone number. When the person, business or organization updates the service option information at the server, the updated service option information is acquired, and the service option displayed in the terminal device is updated so as to facilitate the user to obtain the most recent information on services provided by the person, business or organization.

Further, the interface of the server is used for upgrading service option information. When a contact page of the yellow-pages number is created or the service option information corresponding to the yellow-pages number is upgraded in the contact page of the yellow-pages number, the terminal device acquires service option information by calling the interface of the server. It should be noted that, in addition to being acquired at the above timing, the service option information may also be acquired when the terminal device is starting or may be acquired periodically. However, the present disclosure does not limit the timing of acquiring service option information to the above.

Accordingly, step 201 may further includes: when the terminal device receives an instruction for creating the contact page of the yellow-pages number, acquiring basic information on the yellow-pages number, and acquiring the service option information by calling the interface of the server for upgrading service option information. Herein, the instruction for creating the contact page may be triggered by the user, or transmitted by the server. In addition, the basic information of the yellow-pages number may include information on a name, a phone number and an address corresponding to the yellow-pages number, which may be inputted by the user, or may be acquired by calling the interface of the server. However, the present disclosure is not limited thereto.

In another embodiment according to the present disclosure, step 201 may further includes: detecting the interface of the server for upgrading service option information, and when the upgraded service option information of the yellow-pages number is detected, acquiring the upgraded service option information of the yellow-pages number by calling the interface. Herein, the terminal device may detect the interface in real time or periodically. However, the present disclosure is not limited thereto.

In step 202, when the information type identifier is the webpage type identifier and the service option information includes webpage contents, the step of displaying of the service option in the contact page of the yellow-pages number comprises determining the webpage contents included in the service option information as the service option and displaying the service option corresponding to the service option information in the contact page of the yellow-pages number.

For example, when it is detected that the information type identifier is the webpage type identifier, and the service option information includes webpage contents, the terminal device may determine all of the webpage contents included in the service option information as the service option and display the service option in the contact page of the yellow-pages number, i.e. display all of the webpage contents included in the service option information. In another embodiment of the present disclosure, when it is detected that the information type identifier is the webpage type identifier, and the service option information includes webpage contents, the terminal device may also determine a part of the webpage contents included in the acquired service option information as the service option and display the service option in the contact page of the yellow-pages number, i.e. display the part of the webpage contents included in the service option information. However, the present disclosure is not limited thereto. It should be noted that, the part of the webpage contents may be the part directly associated with the service provided by the person, business or organization. For example, in the case of a room reservation service, the part of the webpage contents may include number of available rooms and the rates of the rooms.

It should be noted that, the service option may retain the original format of the webpage contents, i.e. the service option may include text information, pictures and jump links in the webpage contents. After the service option is displayed in the contact page of the yellow-pages number, the process may jump to an address directed by a jump link in the webpage contents when it is detected that there is a jump instruction.

Figure 3A:
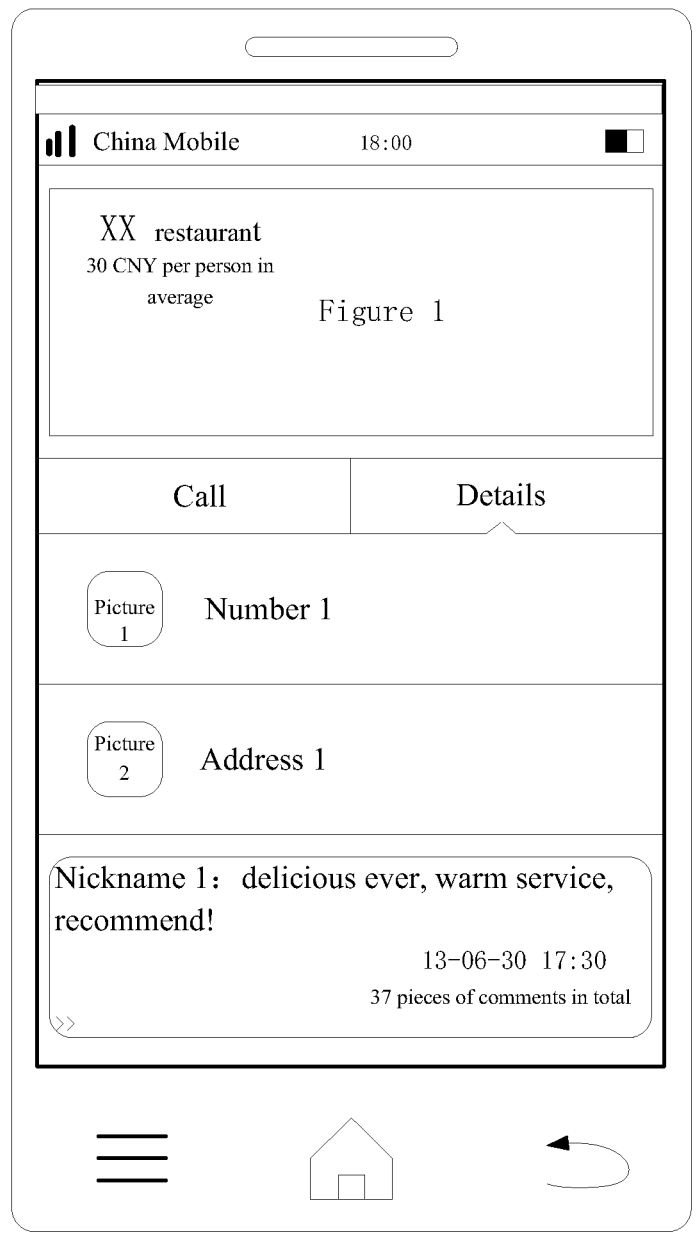
FIG. 3a illustrates an exemplary display showing contact pages of yellow-pages numbers according to an embodiment of the present disclosure.

FIG. 3a illustrates an exemplary display showing a contact page of a yellow-pages number. The displayed basic information of the yellow-pages number includes a name "XX restaurant", a phone number "Number 1" and an address "Address 1". Here, the picture 1 is a phone identifier, and the picture 2 is an address identifier. When an instruction of clicking the "Picture 1" is received, the yellow-pages number may be dialed. When an instruction of clicking the "Picture 2" is received, a map, including a region where an address corresponding to "Address 1" of the yellow-pages number is located, may be displayed. Referring to FIG. 3a, when receiving webpage contents containing comment information, the terminal device determines the most recent piece of comment information as the service option, and displays the service option, i.e. a piece of comment information sent by a user with "Nickname 1", in the page of "Number 1". Here, the webpage contents including the comment information may also include a jump link of "37 pieces of comments in total >>". When an instruction of clicking the jump link is received, the 37 pieces of comments corresponding to the yellow-pages number may be displayed.

In step 203, when the information type identifier is the webpage type identifier and the service option information includes a webpage link, the terminal device acquires corresponding webpage contents according to the webpage link, determines the acquired webpage contents as the service option, and displays the service option corresponding to the service option information in the contact page of the yellow-pages number.

For example, when the information type identifier is the jump-link type identifier and the service option information includes the webpage link, the terminal device acquires all of the corresponding webpage contents according to the webpage link, determines all of the acquired webpage contents as the service option, and displays the service option corresponding to the service option information in the contact page of the yellow-pages number. When the information type identifier is the jump-link type identifier and the service option information includes a webpage link, the terminal device may also acquire a part of the corresponding webpage contents according to the webpage link, determines the acquired part of the webpage contents as the service option, and displays the service option corresponding to the service option information in the contact page of the yellow-pages number. However, the present disclosure is not limited to the acquired webpage contents disclosed above.

Alternatively, when the information type identifier is the jump-link type identifier and the service option information includes a webpage URL (Uniform Resource Locator), the terminal device acquires the webpage contents corresponding to the webpage URL, determines the acquired webpage contents as the service option, and displays the service option in the contact page of the yellow-pages number.

In step 204, when the information type identifier is the jump-link type identifier and the service option information includes a first illustrative text and an application identifier, the terminal device determines the first illustrative text as the service option, displays the service option corresponding to the service option information in the contact page of the yellow-pages number, establishes a mapping relationship between the first illustrative text and an application corresponding to the application identifier, and then a step 205 is performed.

Here, the first illustrative text may be a name of the application corresponding to the application identifier, or a subject matter of a service provided by the yellow-pages number. However, the present disclosure is not limited hereto.

It should be noted that, when the application corresponding to the application identifier has been already installed in the terminal device, after the terminal device determines the first illustrative text as the service option and displays the service option, the terminal device establishes the mapping relationship between the first illustrative text and the application corresponding to the application identifier. When the application corresponding to the application identifier has not been installed in the terminal device, the terminal device may display an installation notice that informs the user of accessing an application store to download the application corresponding to the application identifier, and after the application corresponding to the application identifier is installed in the terminal device, the terminal device establishes the mapping relationship between the first illustrative text and the application corresponding to the application identifier.

Figure 3B:
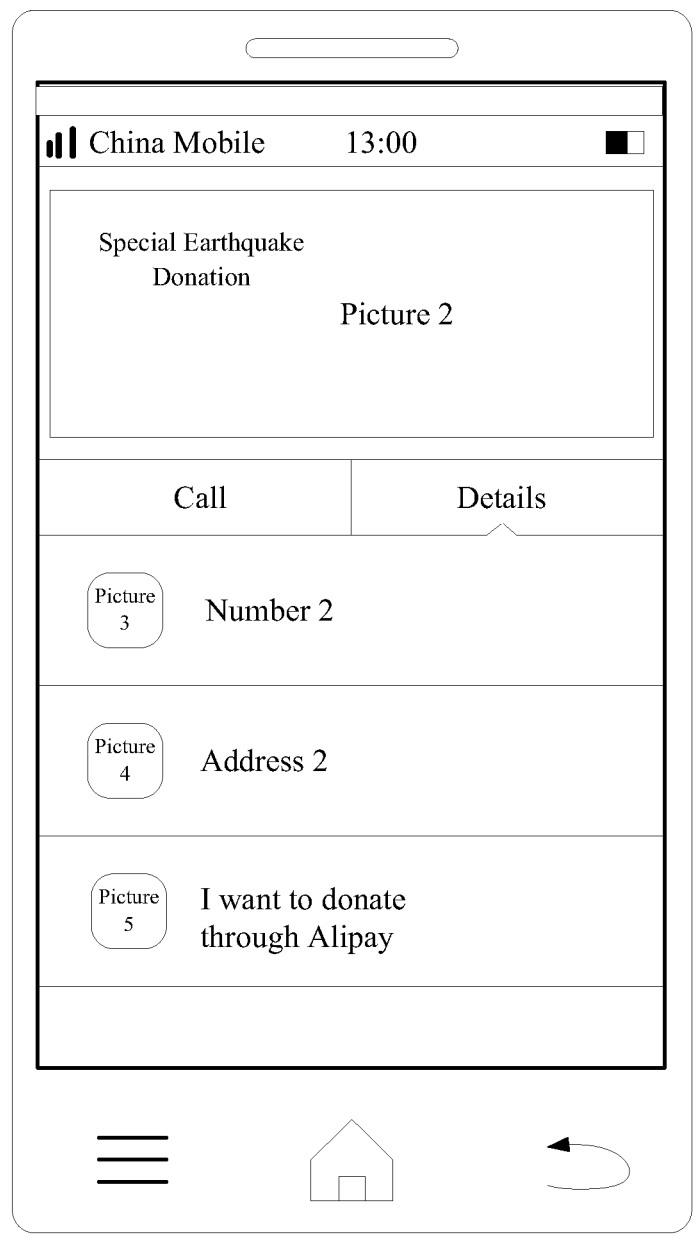
FIG. 3b illustrates an exemplary display showing a contact page of a yellow-pages number according to an embodiment of the present disclosure.

Referring to FIG. 3b, the yellow-pages number is "Number 2", the first illustrative text is "I want to donate through Alipay", and the application identifier is "Alipay". When it is detected that the information type identifier is the jump-link type identifier and the service option information includes the first illustrative text of "I want to donate through Alipay" and the application identifier of "Alipay", the terminal device determines the first illustrative text of "I want to donate through Alipay" as the service option, displays the service option "I want to donate through Alipay" in the contact page of the yellow-pages number of "Number 2", and establishes the mapping relationship between the first illustrative text of "I want to donate through Alipay" and the Alipay application.

In step 205, when an operation of triggering the first illustrative text is detected, the application corresponding to the application identifier is started according to the mapping relationship, and the process is finished.

Herein, the triggering operation may be an operation of clicking the first illustrative text, or a long press on the first illustrative text. However, the present disclosure is not limited hereto.

For example, when the operation of triggering the first illustrative text is detected, the application corresponding to the application identifier is started according to the mapping relationship. Here, after the application corresponding to the application identifier is started, a home interface of the application may be displayed, or an interface of the application corresponding to the function described by the first illustrative text may be displayed. However, the present disclosure is not limited hereto.

For example, referring to FIG. 3b, when an operation of clicking the option "I want to donate through Alipay" is detected, the Alipay application is started, and a funding interface of "Special Earthquake Donation" corresponding to an organization is displayed, thereby facilitating the user to donate.

In practice, an application that requires the input of additional information may be installed in the terminal device, so that more functions may be achieved by acquiring additional information inputted by the user when the application is used. For example, a function of prepaying for a mobile phone bill in the Alipay application requires inputting the phone number of the mobile phone, which serves as the additional information of the Alipay application. Accordingly, step 205 may include: when the operation of triggering the first illustrative text is detected, acquiring the additional information corresponding to the application identifier, starting the application corresponding to the application identifier according to the mapping relationship, and inputting the additional information in the interface of the application.

For example, when the operation of triggering the first illustrative text is detected, additional information required by the application corresponding to the application identifier is determined according to the first illustrative text, the additional information corresponding to the application identifier is acquired, the application corresponding to the application identifier is started according to the mapping relationship, and causing the additional information input into the interface of the application.

Figure 3C:
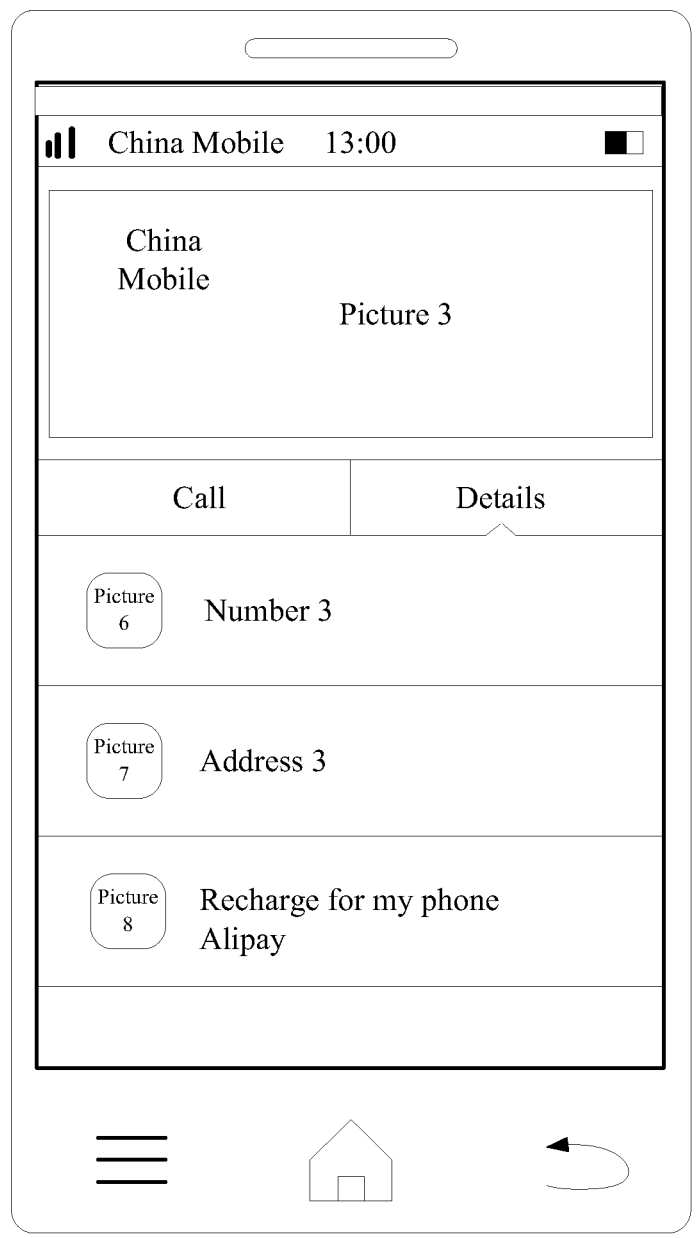
FIG. 3c illustrates an exemplary display showing a contact page of a yellow-pages number according to an embodiment of the present disclosure.

For example, referring to FIG. 3c, when the terminal device detects the operation of clicking the first illustrative text of "Prepaying for phone through Alipay", it is determined that the additional information required by the application corresponding to the application identifier is a phone number of the terminal device. In this case, the phone number of the terminal device is acquired as the additional information, the Alipay application installed in the terminal device is started according to the mapping relationship between the first illustrative text of "Prepaying for phone through Alipay" and the Alipay application, the interface of the Alipay application is displayed, and the phone number of the terminal device is input into the interface of the Alipay application, so as to prepay for the terminal device according to the phone number.

In step 206, when the information type identifier is the jump-link type identifier and the service option information includes a second illustrative text and a corresponding webpage link, the second illustrative text is determined as the service option, the service option corresponding to the service option information is displayed in the contact page of the yellow-pages number, and then a step 207 is performed.

Here, the second illustrative text may be a webpage title of the corresponding webpage link or a part of the webpage contents, and the like. However, the present disclosure is not limited hereto.

Figure 3D:
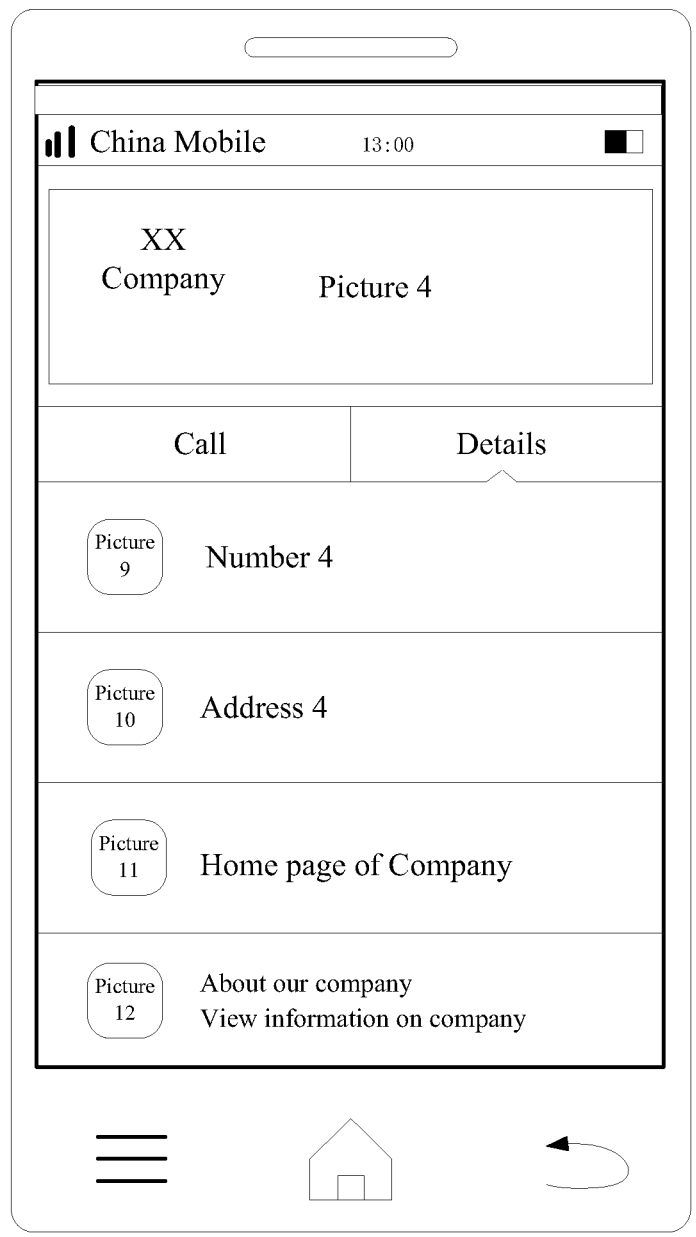
FIG. 3d illustrates an exemplary display showing a contact page of a yellow-pages number according to an embodiment of the present disclosure.

For example, referring to FIG. 3d, the information type identifier included in the service option information acquired by the terminal device is the jump-link type identifier, and the service option information includes the second illustrative text of "Home page of company" and the corresponding webpage link of the company website of "XX company". In this case, the second illustrative text of "Home page of company" is determined as the service option, and the service option is displayed in the contact page of the yellow-pages number of "Number 4".

In step 207, when an operation of triggering the second illustrative text is detected, the process jumps to a webpage directed to by the corresponding webpage link, and then the process is finished.

Here, the trigger operation may be the click operation or the long press on the second illustrative text. However, the present disclosure is not limited hereto.

Referring to FIG. 3d, when an operation of triggering the second illustrative text "Home page of company" is detected, the process jumps to the company website of "XX company".

It should be noted that, in the present disclosure, a plurality of functions may be provided through the yellow-pages number and a plurality of service options may be displayed in the contact page of the yellow-pages number. Alternatively, a slide bar is created in the contact page of the yellow-pages number so as to facilitate the user to view the plurality of service options.

Furthermore, when the number of the service options provided by the yellow-pages number exceeds a preset threshold, "more options" is determined as a first-level service option, a preset number of service options are selected, the preset number of service options are determined as the sub options of the first-level service option, and the first-level service option is displayed in the contact page of the yellow-pages number. When an operation of triggering the first-level service option is detected, the preset number of service option is displayed. The preset number of service options may be the service options corresponding to the service option information containing the webpage type identifier, or may be the service options corresponding to the service option information containing the jump-ink type identifier. However, the present disclosure is not limited hereto.

Figure 3E:
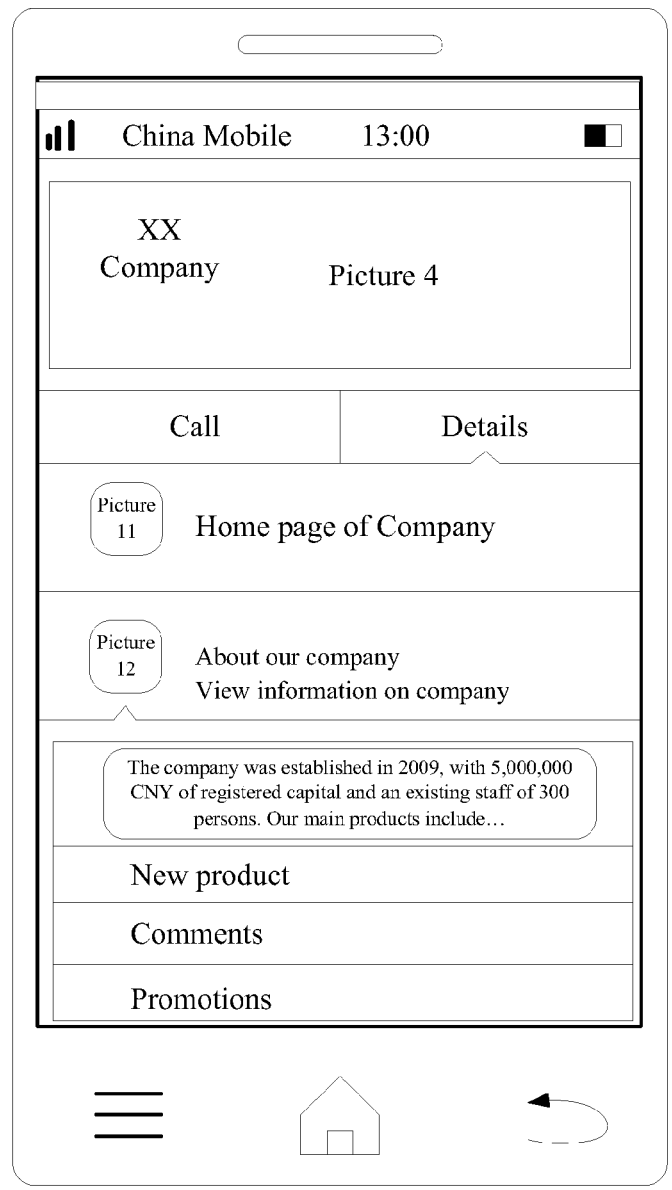
FIG. 3e illustrates an exemplary display showing a contact page of a yellow-pages number according to an embodiment of the present disclosure.

Referring to FIG. 3e, "About our company viewing information on company" is a first-level service option. When an operation of triggering "About our company viewing information on company" is detected, the sub options of the first-level service option are displayed. Here, a first sub option is the service option corresponding to the service option information, which contains the webpage type identifier, and other sub options are service options corresponding to the service option information containing the webpage type identifier.

In addition, the method may further include a step of: when the information type identifier is the jump-link type identifier and the service option information includes a third illustrative text and a corresponding file path, determining the third illustrative text as the service option, and displaying the service option corresponding to the service option information in the page of the yellow-pages number; jumping to the corresponding file path when an operation of triggering the third illustrative text is detected.

Here, the corresponding file path is the file path corresponding to the third illustrative text in the terminal device. For an application capable of providing a function such as uploading and downloading files, when the terminal device acquires the service option information of this application, a file folder of the application is created in the corresponding file path, the third illustrative text is determined as the service option, and the service option corresponding to the service option information is displayed in the contact page of the yellow-pages number. When an operation of triggering the third illustrative text is detected, the process jumps to the corresponding file path and the operation such as uploading and downloading files is performed.

Further, when the information type identifier is the jump-link type identifier, the jumping object of the service option may be an application installed in the terminal device, a webpage directed to by a webpage link, a file path of the terminal device, and the like. However, the present disclosure is not limited hereto.

It should be noted that, when the information type identifier is the jump-link type identifier, information such as a main title, a sub title and an icon of the webpage link or the application may be displayed while the service option of the webpage link included in the service option information or the application is displayed. For example, in the case of a promotion activity of an organization, a relatively notable picture for the promotion activity may be displayed while the service option is displayed, so as to give notice to the users.

With the present disclosure, service options corresponding to the plurality of services extended from the yellow-pages number may be displayed in the contact page of the yellow-pages number, and service option information which contains different information type identifiers may be displayed in different manners, thereby meeting different requirements for the displaying of the contact page of the service option information.

In the method according to the present disclosure, the service option information of the yellow-pages number, which contains the information type identifier, is acquired, and the service option corresponding to the service option information is displayed in the contact page of the yellow-pages number according to the information type identifier. By displaying the service option corresponding to the service option information in the contact page of the yellow-pages number, the technical solution of present disclosure can add various service options corresponding to various services provided by the person, business or organization, represented by the yellow-pages number into the contact list, and may prompt a user without costing excessive manpower and material resources on separate developments for each service, and thus the method is expandable, easy to operate and time efficient.

Figure 4:
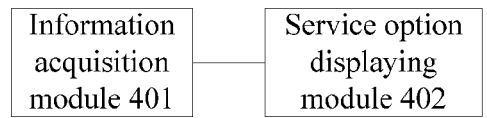
FIG. 4 is a schematic block diagram showing an apparatus for displaying information in the terminal device according to an embodiment of the present disclosure.

FIG. 4 is a schematic block diagram showing an apparatus for displaying information according to the present disclosure. Referring to FIG. 4, the apparatus includes: An information acquisition module 401 configured to acquire service option information with an information type identifier of a yellow-pages number; and a service option displaying module 402 configured to display a service option corresponding to the service option information in a contact page of the yellow-pages number according to the information type identifier.

For example, the information acquisition module 401 is configured to acquire the service option information of the yellow-pages number by calling an interface of a server for upgrading the service option information.

For example, the service option displaying module 402 includes a first displaying unit, a second displaying unit, a third displaying unit and a fourth displaying unit.

The first displaying unit is configured to, when the information type identifier is a webpage type identifier and the service option information includes webpage contents, determine the webpage contents included in the service option information as the service option, and display the service option corresponding to the service option information in the contact page of the yellow-pages number.

The second displaying unit is configured to, when the information type identifier is the webpage type identifier and the service option information includes a webpage link, acquire webpage contents corresponding to the webpage link, determine the acquired webpage contents as the service option, and display the service option corresponding to the service option information in the contact page of the yellow-pages number.

The third displaying unit is configured to, when the information type identifier is a jump-link type identifier and the service option information includes a first illustrative text and an application identifier, determine the first illustrative text as the service option, display the service option corresponding to the service option information in the contact page of the yellow-pages number, and establish a mapping relationship between the first illustrative text and an application corresponding to the application identifier.

At last, the fourth displaying unit is configured to, when the information type identifier is the jump-link type identifier and the service option information includes a second illustrative text and a corresponding webpage link, determine the second illustrative text as the service option, and display the service option corresponding to the service option information in the contact page of the yellow-pages number.

For example, the apparatus further includes: an application starting module configured to, when an operation of triggering the first illustrative text is detected, start the application corresponding to the application identifier according to the mapping relationship.

For example, when an operation of triggering the first illustrative text is detected, the application starting module is configured to acquire additional information corresponding to the application identifier, and start the application corresponding to the application identifier according to the mapping relationship so as to input the additional information in an interface of the application.

For example, the apparatus further includes: a webpage jumping module configured to, when an operation of triggering the second illustrative text is detected, jump to a webpage directed to by the corresponding webpage link.

In the apparatus according to the present disclosure, the service option information of the yellow-pages number, which contains the information type identifier, is acquired, and the service option corresponding to the service option information is displayed in the contact page of the yellow-pages number according to the information type identifier. By displaying the service option corresponding to the service option information in the contact page of the yellow-pages number, the technical solution of present disclosure can add various service options corresponding to various services provided by a person, a business or an organization, represented by the yellow-pages number into the contact list, and may prompt a user without costing excessive manpower and material resources on separate developments for each service, and thus the method is expandable, easy to operate and time efficient.

It should be noted that, the apparatus for displaying information according to the above embodiments is only illustrated as the function modules in, for example, the above division manner. In practical application, the above functions may be assigned to different function modules as desired, that is, the internal structure of the terminal device may be divided into different function modules to accomplish all or a part of the functions described above. Besides, the above embodiments of the apparatus and the method for displaying information in the terminal device belong to the same invention concept, and the specific operating procedure of the apparatus may refer to the embodiments of the method. Therefore, the description thereof will not be repeated herein.

Figure 5:
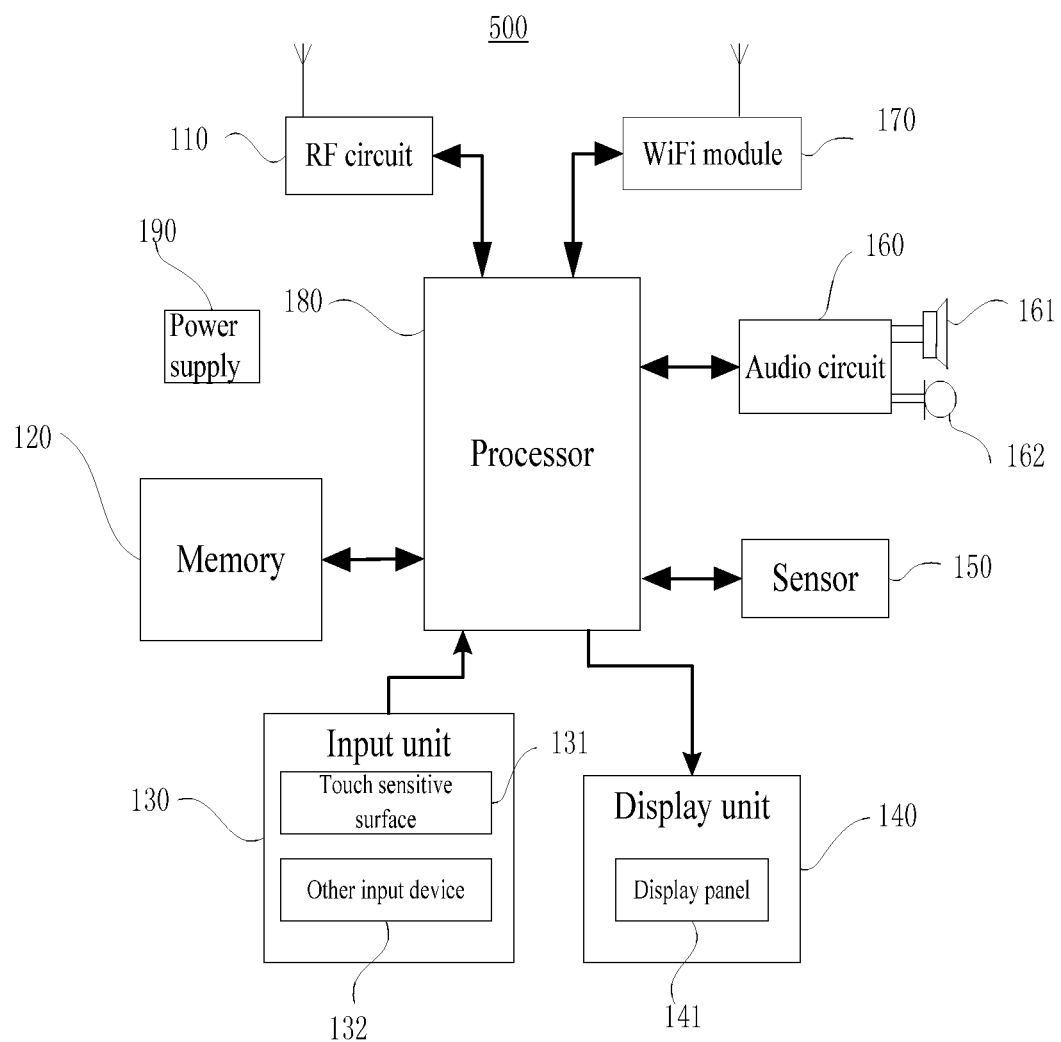
FIG. 5 is a schematic block diagram showing a terminal device according to an embodiment of the present disclosure.

FIG. 5 is a schematic block diagram showing a terminal device according to the present disclosure. Referring to FIG. 5, the terminal device may be configured to perform the method for displaying information according to the above embodiments, specifically as follows. According to the present disclosure, the terminal device 500 may be a mobile phone, a computer, a digital broadcast terminal, a messaging device, a gaming console, a tablet, a medical device, exercise equipment, a personal digital assistant, and the like.

The terminal device 500 may include a radio frequency circuit 110, a memory 120 including one or more computer-readable storage medium, an input unit 130, a display unit 140, a sensor 150, an audio circuit 160, a WiFi module 170, a processor 180 including one or more processing cores, a power supply 190, and other components. It should be appreciated by those skilled in the art that, the structure of the terminal device shown in FIG. 5 does not constitute a limitation to the terminal device, and it may include more or less components than those illustrated in the drawings, or combine some of the components, or be composed of different components.

The radio frequency circuit 110 may be configured to transmit and receive information during the transmitting and receiving of information or communication. In particular, after receiving downlink information from a base station, the radio frequency circuit 110 transfers the information to one or more processors 180 to process. Also, the radio frequency circuit 110 transmits uplink data to the base station. Generally, the radio frequency circuit as a communication unit includes, but is not limited to an antenna, at least one amplifier, a tuner, one or more oscillators, a subscriber identity module (SIM) card, a transceiver, a coupler, a LNA (Low Noise Amplifier), a duplexer, etc. Furthermore, the radio frequency circuit 110 may communicate with other devices through a wireless network and Internet. The wireless network may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), and so on. The memory 120 may be configured to store software programs and modules. The processor 180 implements various functions and data processing by running the software programs and modules stored in the memory 120. The memory 120 may mainly include a program storage area and a data storage area, wherein the program storage area may store an operation system program, an application required by at least one function (such as a function of sound playback, a function of image playback, etc.), and so on, and the data storage area may store data (such as audio data, phone book, etc.) created during the operation of the terminal device 500, and so on. In addition, the memory 120 may include a high-speed random access memory and may also include anon-volatile memory. For example, the memory 120 includes at least one disk storage device, a flash memory device, or other volatile solid-state memory devices. Accordingly, the memory 120 may also include a memory controller to provide access for the processor 180 and the input unit 130 to the memory 120.

The input unit 130 may be configured to receive the input numbers or characters, and generate keyboard, mouse, joystick, optical or trackball input signals related to a user setting and a functional control. Specifically, the input unit 130 may include a touch sensitive surface 131 and other input device 132. The touch sensitive surface 131, also known as a touch screen or a track pad, may collect touch operations on or near the touch sensitive surface 131 from a user (such as an operation on or near the touch sensitive surface 131 by the user using any suitable object or accessory component such as a finger, a stylus and the like), and drive a corresponding connection device according to a preset routine. Alternatively, the touch sensitive surface 131 may include both of a touch detection device and a touch controller. Here, the touch detection device detects a touching position of the user, detects a signal caused by the touch operation, and transmits the signal to the touch controller. The touch controller receives touch information from the touch detection device, transform it into coordinates of the touch point, and send it to the processor 180. The touch controller may also receive a command from the processor 180 and execute the command. In addition, the touch sensitive surface 131 may be realized in various types, such as resistive, capacitive, infrared and acoustic wave types. In addition to the touch sensitive surface 131, the input unit 130 may also include other input device 132. Specifically, the other input device 132 may include, but is not limited to, one or more of a physical keyboard, function buttons (such as volume control buttons, switch buttons, etc.), a trackball, a mouse, an operation lever, and so on.

The display unit 140 may be configured to display information inputted by the user or information provided to the user and various graphical user interfaces of the terminal device 500. These graphical user interfaces may consist of graphics, text, icon, video, and any combination thereof. The display unit 140 may include a display panel 141, and alternatively, the display panel 141 may be configured by LCD (Liquid Crystal Display), OLED (Organic Light-Emitting Diode), and so on. Further, the touch sensitive surface 131 may cover the display panel 141. When the touch sensitive surface 131 detects a touch operation thereon or near, the touch operation is sent to the processor 180 to determine the type of touch event, and subsequently the processor 180 provides a corresponding visual output on the display panel 141 according to the type of touch event. Although the touch sensitive surface 131 and the display panel 141 in FIG. 5 are two separate components to accomplish the input function and the output function respectively, in some embodiments, the touch sensitive surface 131 and the display panel 141 may be integrated into a component to realize both of the input and output functions.

The terminal device 500 may further include at least one kind of sensor 150, such as a light sensor, a motion sensor, and other sensor. Specifically, the light sensor may include an ambient light sensor and a proximity sensor. Here, the ambient light sensor may adjust the brightness of the display panel 141 according to the brightness of the ambient light. The proximity sensor may turn off the display panel 141 and/or backlight when the terminal device 500 moves close to an ear. As a kind of the motion sensor, a gravity sensor may detect the amplitude of the acceleration in each direction (typically in three axes), and may detect the amplitude and the direction of the gravity in a stationary state, which may be applied to the applications for recognizing the attitudes of the mobile phone (such as horizontal and vertical screen switching, games, attitudes calibration of a magnetometer), the applications with functions related to vibration recognition (such as a pedometer, clicking), etc. The terminal device 500 may also be equipped with other sensors such as a gyroscope, a barometer, a hygrometer, a thermometer, an infrared sensor, etc., the description of which will be omitted herein.

The audio circuit 160, a speaker 161 and a microphone 162 may provide an audio interface between the user and the terminal device 500. The audio circuit 160 may transform the received audio data into an electrical signal, which is transmitted to the speaker 161 and transformed into a sound signal to be outputted by the speaker 161. On the other hand, the microphone 162 transforms the collected sound signal into an electrical signal, which is received and transformed into audio data by the audio circuit 160, and then the audio data, after being outputted to the processor 180 to be processed, is transmitted to, for example, another terminal device via the RF circuit 110 or outputted to the memory 120 for further processing. The audio circuit 160 may also include a headphone jack to allow a communication between an external headphone and the terminal device 500.

In order to achieve wireless communication, the terminal device may be equipped with the WiFi module 170. WiFi is a short-range wireless transmission technology. The terminal device 500 allows the user to send and receive email, browse webpage and access streaming media, and the like through the WiFi module 170 which provides a wireless broadband Internet access. Although FIG. 5 shows the WiFi module 170, it should be understood that the WiFi module 170 is not a necessary component of the terminal device 500, and may be omitted as desired without changing the substantive scope of the invention.

The processor 180 is a control center of the terminal device 500 that connects various parts of the entire mobile phone through various interfaces and circuits, performs various functions and processes data by running and executing software programs and/or modules stored in the memory 120 and by calling the data stored in the memory 120, so as to monitor the overall terminal device 500. Alternatively, the processor 180 may include one or more processing cores. For example, the processor 180 may be integrated with an application processor that mainly processes an operation system, a user interface and applications and a modem processor that mainly processes the wireless communication. It should be understood that, the above modem processor might not be integrated in the processor 180.

The terminal device 500 may also include a power supply 190 (such as a battery) to supply power to each component. For example, the power supply may be logically connected to the processor 180 through a power supply management system, so as to manage the functions such as charging, discharging and power consumption, etc. through the power supply management system. The power supply 190 may also include any one or more components of an AC or DC power, a recharging system, a power fault detection circuit, a converter or an inverter, a power status indicator, etc.

Although not shown, the terminal device 500 may also include a camera, a Bluetooth module, the details of which is not repeated herein. In this specific embodiment, the display unit of the terminal device is a touch screen display, and the terminal device further includes a memory that further includes one or more programs configured to be executable by the one or more processors 180 to realize the methods contained therein for displaying information according to the embodiments shown in FIG. 1 and FIG. 2.

In another aspect, a computer-readable storage medium is provided by another embodiment of the present disclosure, which may be a computer-readable storage medium contained in the memory in the above embodiments, or may be a separate computer-readable storage medium that is not installed in the terminal. The computer-readable storage medium has one or more programs to be executable by the one or more processors 180 to realize the methods for displaying information according to the embodiments shown in FIG. 1 and FIG. 2.

It should be understood by those skilled in the art that, all or a part of the steps of the above embodiments may be implemented through hardware, or through a program that instructs a related hardware. The program may be stored in a computer-readable storage medium, which may be a read-only memory, magnetic or optical disk.

The foregoing embodiments are only preferred embodiments of the present disclosure, and do not intend to limit the present disclosure. Any variation, equivalent substitution and modification that fall within the concept and principle of the present disclosure should be embraced by the protection scope of the present disclosure.

What is claimed is:

1. A method for integrating yellow-pages number related information into a contact list application of a mobile terminal device, comprising:

creating, according to basic information on a yellow-pages number, a contact page of the yellow-pages number in the contact list application;

acquiring, from a server, service option information corresponding to the yellow-pages number without an extra user request for the service option information, wherein the service option information includes an information type identifier;

determining a service option from the service option information by judging what the information type identifier is;

displaying both the yellow-pages number and the service option on the contact page of the yellow-pages number to directly present both the yellow-pages number and the service option associated with the yellow-pages number to a user of the mobile terminal device through the contact list application, wherein when the information type identifier is a webpage type identifier and the service option information includes webpage contents or a webpage link, a part of the webpage contents or webpage contents corresponding to the webpage link is displayed on the contact page of the yellow-pages number and integrated into the contact list application without an extra user click;

wherein when the information type identifier is a lump-link type identifier and the service option information further includes a first illustrative text and an application identifier, the first illustrative text is determined as the service option and displayed on the contact page of the yellow-pages number; and wherein the method further comprises: creating a mapping relationship between the first illustrative text and an application corresponding to the application identifier.

2. The method according to claim 1, wherein the service option information corresponding to the yellow-pages number is acquired by calling an interface of the server for upgrading the service option information.

3. The method according to claim 1, wherein when the information type identifier is a jump-link type identifier and the service option information includes a second illustrative text and a corresponding webpage link, the second illustrative text is determined as the service option and displayed on the contact page of the yellow-pages number.

4. The method according to claim 1, wherein when an operation of triggering the first illustrative text is detected, the method further comprises:

starting the application corresponding to the application identifier according to the mapping relationship.

5. The method according to claim 4, wherein starting the application corresponding to the application identifier according to the mapping relationship comprises:

acquiring additional information corresponding to the application identifier, when an operation of triggering the first illustrative text is detected; and starting the application corresponding to the application identifier according to the mapping relationship so as to input the additional information into an interface of the application.

6. The method according to claim 3, wherein when an operation of triggering the second illustrative text is detected, the method further comprises:

jumping to a webpage directed to by the corresponding webpage link.

7. The method according to claim 1, before creating the contact page of the yellow-pages number in the contact list application, the method further comprises:

receiving an instruction for creating the contact page of the yellow-pages number in the contact list application from the user or the server.

8. A mobile terminal device, comprising:
a processor; and
a memory for storing instructions executable by the processor;
wherein the processor is configured to execute the instructions to:
create, according to basic information on a yellow-pages number, a contact page of the yellow-pages number in a contact list application of the mobile terminal device;
acquire, from a server, service option information corresponding to the yellow-pages number without an extra user request for the service option information, wherein the service option information includes an information type identifier;
determine a service option from the service option information by judging what the information type identifier is;
display both the yellow-pages number and the service option on the contact page of the yellow-pages number to directly present both the yellow-pages number and the service option associated with the yellow-pages number to a user of the mobile terminal device through the contact list application,
wherein when the information type identifier is a webpage type identifier and the service option information includes webpage contents or a webpage link, a part of the webpage contents or webpage contents corresponding to the webpage link is displayed on the contact page of the yellow-pages number and is integrated into the contact list application without an extra user click;
wherein when the information type identifier is a lump-link type identifier and the service option information further includes a first illustrative text and an application identifier, the first illustrative text is determined as the service option and displayed on the contact page of the yellow-pages number; and
wherein the processor is further configured to execute the instructions to: create a mapping relationship between the first illustrative text and an application corresponding to the application identifier.

9. The mobile terminal device according to claim 8, wherein the service option information corresponding to the yellow-pages number is acquired by calling an interface of the server for upgrading the service option information.

10. The mobile terminal device according to claim 8, wherein when the information type identifier is a jump-link type identifier and the service option information further includes a second illustrative text and a corresponding webpage link, the second illustrative text is determined as the service option and displayed on the contact page of the yellow-pages number.

11. The mobile terminal device according to claim 8, wherein when an operation of triggering the first illustrative text is detected, the processor is further configured to execute the instructions to:
start the application corresponding to the application identifier according to the mapping relationship.

12. The mobile terminal device according to claim 11, wherein for starting the application corresponding to the application identifier according to the mapping relationship comprises, the processor is configured to execute the instructions to:
acquire additional information corresponding to the application identifier, when an operation of triggering the first illustrative text is detected; and
start the application corresponding to the application identifier according to the mapping relationship so as to input the additional information into an interface of the application.

13. The mobile terminal device according to claim 10, wherein when an operation of triggering the second illustrative text is detected, the processor is configured to execute the instructions to:
jump to a webpage directed to by the corresponding webpage link.

14. A non-transitory computer-readable storage medium having stored therein instructions that, when executed by a processor of a mobile terminal device, causes the mobile terminal device to perform a method for integrating yellow-pages number related information into a contact list application, the method comprising:
creating, according to basic information on a yellow-pages number, a contact page of the yellow-pages number in the contact list application;
acquiring, from a server, service option information corresponding to the yellow-pages number without an extra user request for the service option information, wherein the service option information includes an information type identifier;
determining a service option from the service option information by judging what the information type identifier is;
displaying both the yellow-pages number and the service option on the contact page of the yellow-pages number to directly present both the yellow-pages number and the service option associated with the yellow-pages number to a user of the mobile terminal device through the contact list application,
wherein when the information type identifier is a webpage type identifier and the service option information includes webpage contents or a webpage link, a part of the webpage contents or webpage contents corresponding to the webpage link is displayed on the contact page of the yellow-pages number and integrated into the contact list application without an extra user click;
wherein when the information type identifier is a lump-link type identifier and the service option information further includes a first illustrative text and an application identifier, the first illustrative text is determined as the service option and displayed on the contact page of the yellow-pages number; and
wherein the method further comprises: creating a mapping relationship between the first illustrative text and an application corresponding to the application identifier.

* * * * *